(12) United States Patent
Bansal et al.

(10) Patent No.: US 12,450,577 B2
(45) Date of Patent: Oct. 21, 2025

(54) METHODS AND SYSTEMS FOR PERFORMING SECURE TRANSACTIONS ASSOCIATED WITH INSTRUCTIONS RECEIVED IN NATURAL LANGUAGE FORM

(71) Applicant: Mastercard International Incorporated, Purchase, NY (US)

(72) Inventors: Peeyush Bansal, New Delhi (IN); Avinash Kumar, Bokaro (IN); Rishabh Mehra, Ghaziabad (IN)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 18/476,914

(22) Filed: Sep. 28, 2023

(65) Prior Publication Data
US 2024/0020658 A1 Jan. 18, 2024

Related U.S. Application Data

(62) Division of application No. 17/236,057, filed on Apr. 21, 2021, now Pat. No. 11,887,066.

(51) Int. Cl.
*G06F 21/32* (2013.01)
*G06F 21/34* (2013.01)
(Continued)

(52) U.S. Cl.
CPC .......... *G06Q 20/02* (2013.01); *G06F 21/32* (2013.01); *G06F 21/34* (2013.01); *G06F 40/205* (2020.01);
(Continued)

(58) Field of Classification Search
CPC .. G06Q 20/02; G06Q 20/326; G06Q 20/3829; G06Q 20/386; G06Q 20/40145;
(Continued)

(56) References Cited

U.S. PATENT DOCUMENTS 10,824,703 B1 * 11/2020 Desai .................. G06V 40/70
11,227,187 B1 * 1/2022 Weinberger ............ G10L 15/19
(Continued)

FOREIGN PATENT DOCUMENTS

CN 102880960 A * 1/2013
JP 2013206257 A * 10/2013

OTHER PUBLICATIONS

"A Framework for Analyzing Template Security and Privacy in Biometric Authentication Systems", Koen Simoens, IEEE Transactions on Information Forensics and Security, vol. 7, No. 2, Apr. 2012 (Year: 2012).*

*Primary Examiner* — Duan Zhang
(74) *Attorney, Agent, or Firm* — Hovey Williams LLP

(57) ABSTRACT

Embodiments provide methods and systems for facilitating scheduled payment transactions to users via an application provided by the server system, the application available on the user device. The method performed by the server system includes receiving a transaction request message from the user device, the transaction request message includes scheduled transaction instruction provided by the user in natural language format. The method includes authenticating the user based on a plurality of user authentication factors received from the user at pre-defined time intervals. In an embodiment, the server system is configured to train a data model using ML algorithms by learning the plurality of user authentication factors based on which the user is automatically authenticated by the server system. Upon successful authentication, the method includes parsing the transaction request message to determine a scheduled transaction instruction. The method includes facilitating, processing of the scheduled transaction based on the scheduled transaction instruction.

18 Claims, 8 Drawing Sheets

(51) Int. Cl.
  *G06F 40/205*   (2020.01)
  *G06N 20/00*    (2019.01)
  *G06Q 20/02*    (2012.01)
  *G06Q 20/32*    (2012.01)
  *G06Q 20/38*    (2012.01)
  *G06Q 20/40*    (2012.01)
  *G06Q 40/02*    (2023.01)

(52) U.S. Cl.
  CPC ........... *G06N 20/00* (2019.01); *G06Q 20/326*
    (2020.05); *G06Q 20/3829* (2013.01); *G06Q 20/386* (2020.05); *G06Q 20/40145* (2013.01); *G06Q 20/4015* (2020.05); *G06Q 40/02* (2013.01); *G06Q 2220/00* (2013.01)

(58) Field of Classification Search
  CPC ............... G06Q 20/4015; G06Q 40/02; G06Q 2220/00; G06Q 20/4014; G06Q 20/405; G06F 21/32; G06F 21/34; G06F 40/205; G06N 20/00
  See application file for complete search history.

(56) References Cited

U.S. PATENT DOCUMENTS

| | | | |
|---|---|---|---|
| 11,394,552 B2 * | 7/2022 | Streit | G06F 7/5443 |
| 2007/0255963 A1 * | 11/2007 | Pizano | G06F 21/32 |
| | | | 713/189 |
| 2011/0099067 A1 * | 4/2011 | Cooper | G06Q 40/02 |
| | | | 705/14.53 |
| 2017/0223015 A1 * | 8/2017 | Lee | H04L 9/0869 |
| 2018/0114127 A1 * | 4/2018 | Cole | H04L 67/52 |
| 2020/0349245 A1 * | 11/2020 | Shila | G07C 9/257 |

* cited by examiner

METHODS AND SYSTEMS FOR PERFORMING SECURE TRANSACTIONS ASSOCIATED WITH INSTRUCTIONS RECEIVED IN NATURAL LANGUAGE FORM

CROSS REFERENCE TO RELATED APPLICATIONS

This is a divisional application of U.S. patent application Ser. No. 17/236,057, filed Apr. 21, 2021, and titled METHODS AND SYSTEMS FOR PERFORMING SECURE TRANSACTIONS ASSOCIATED WITH INSTRUCTIONS RECEIVED IN NATURAL LANGUAGE FORM, which, itself claims priority to Indian Application No. 202041022797, filed May 30, 2020. Each of the listed earlier-filed applications is incorporated herein by reference in its entirety.

TECHNICAL FIELD

The present disclosure relates to methods and systems for making scheduled payment transactions via text/voice commands and, more particularly to, interpreting the audio/voice commands using natural language processing and authenticating a user via a trained data model including a plurality of user authentication factors.

BACKGROUND

With the growth of payment technology, more and more people are making financial transactions via digital or online means. User authentication is a very important aspect in a digital transaction. However, authentication process is often times very vulnerable, and the payment networks and other entities like issuing banks are striving hard to make it safe. Since making effortless payment transactions for the users is a very important factor, many technologies are being brought into the market to make the authentication more secure and less inquisitive for the users. For instance, the present authenticating methods require the user to enter a password or wait for a One Time Password (OTP) to be received on user device, memorize the OTP and then enter it. In this whole process, there are chances of their data getting stolen or a session failure leading to incomplete transaction.

Further, the digital payment process at times, becomes cumbersome for the users. For example, the users may have to navigate through a lot of menu options on the payment interface to process a transaction, and there is very little room of deviation from the set processes and protocols defined for the payment interfaces, when the users access the payment interfaces. Moreover, scheduling a transaction to be performed later by the users is also challenging, and difficult to authorize, and the entire process is not very intuitive and user-friendly.

Hence, there exists a need for technological solutions for making the digital payment process more intuitive, easy to use for the users and at the same time, making the authentication process safe for the users. Further, these technological solutions should also be capable of allowing the users to set the scheduled transactions without having to follow the cumbersome process typically set by the payment interfaces.

SUMMARY

Various embodiments of the present disclosure provide systems, methods and computer program products for facilitating users to perform scheduled payment transactions using a text/audio command and enable automatic authentication of the user by trained models while scheduling the transaction and performing the scheduled transactions.

In an embodiment, a computer-implemented method is disclosed. The method includes receiving, by a server system, a transaction request message from a payment application available on a user device. The transaction request message at least includes a scheduled transaction instruction in the form of natural language input. The computer-implemented method further includes authenticating, by the server system, a user associated with the transaction request message based, at least in part, on a plurality of user authentication factors, wherein the plurality of user authentication factors is received from the user device by the server system. Upon successful authentication of the user, the computer-implemented method includes parsing, by the server system, the transaction request message to determine the scheduled transaction instruction. The computer-implemented method further includes facilitating, by the server system, processing of a scheduled transaction based, at least in part, on the determined scheduled transaction instruction.

In another embodiment, a server system is provided. The server system includes a communication interface configured to receive a transaction request message from a payment application available on a user device. The transaction request message includes a scheduled transaction instruction in form of natural language input. The server system further includes a memory including executable instructions and a processor communicably coupled to the communication interface. The processor is configured to execute the instructions to cause the server system at least to authenticate a user associated with the transaction request message based, at least in part, on a plurality of user authentication factors. The plurality of user authentication factors is received from the user device by the server system. Upon successful authentication, the server system is further configured to, upon successful authentication of the user, parse the transaction request message to determine the scheduled transaction instruction. The server system is further caused to facilitate processing of a scheduled transaction based, at least in part, on the determined scheduled transaction instruction.

In yet another embodiment, a computer-implemented method is disclosed. The method includes receiving, by a server system, a transaction request message from a payment application available on a user device. The transaction request message includes encrypted scheduled transaction instruction and real-time user authentication factors. The computer-implemented method includes decrypting, by the server system, the transaction request message using an authentication key. The computer-implemented method further includes matching, by the server system, the real-time user authentication factors with a plurality of authentication templates. In response to a successful match, the computer-implemented method includes authenticating, by the server system, a user associated with the transaction request message. The computer-implemented method further includes generating, by the server system, a payment processing request. The computer-implemented method includes transmitting, by the server system, the payment processing request to a payment server.

BRIEF DESCRIPTION OF THE FIGURES

For a more complete understanding of example embodiments of the present technology, reference is now made to the following descriptions taken in connection with the accompanying drawings in which.

Figure 1:
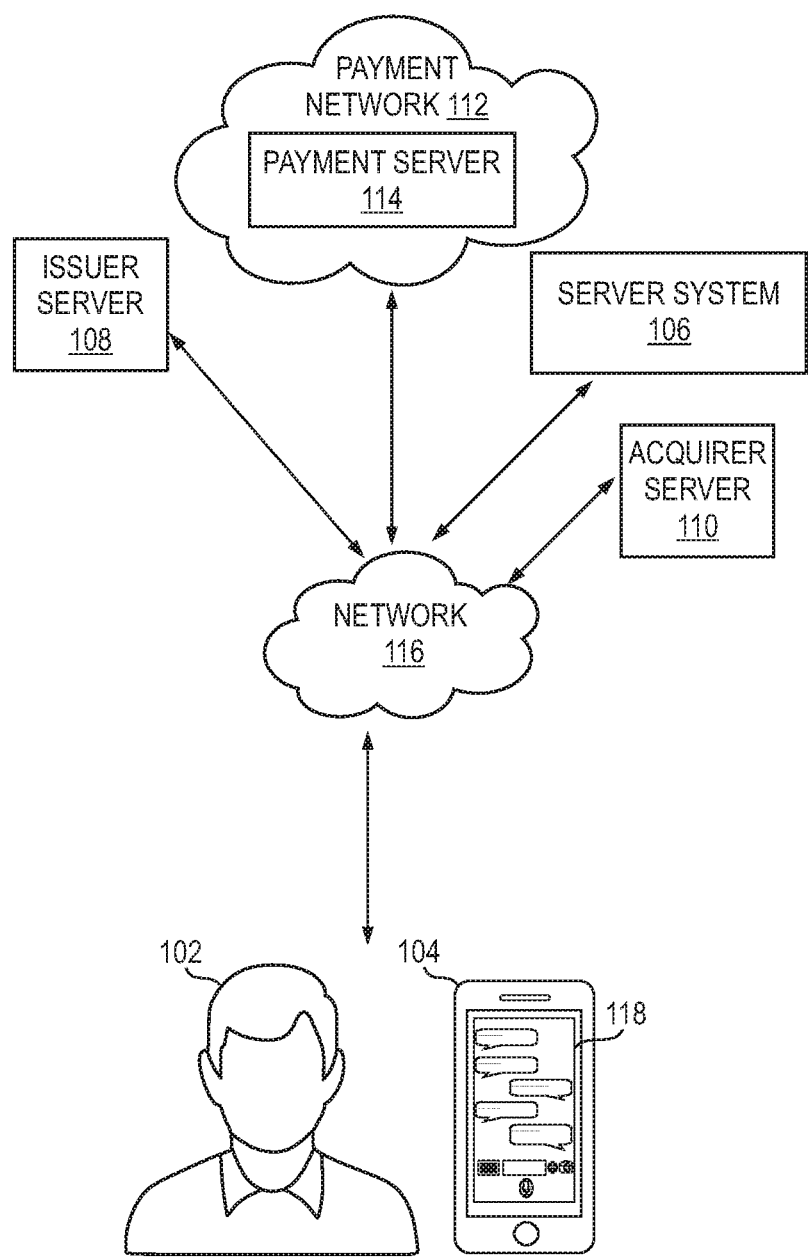
FIG. 1 is an example representation of an environment, related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "payment account" is used throughout the description and refers to a financial account that is used to fund the financial transaction (interchangeably referred to as "payment transaction"). Examples of the payment account include, but are not limited to a savings account, a credit account, a checking account and a virtual payment account. The payment account may be associated with an entity such as an individual person, a family, a commercial entity, a company, a corporation, a governmental entity, a non-profit organization and the like. In some scenarios, a payment account may be a virtual or temporary payment account that can be mapped or linked to a primary payment account, such as those accounts managed by payment wallet service providers.

The term "payment network", used throughout the description, refers to a network or collection of systems used for the transfer of funds through the use of cash-substitutes. Payment networks may use a variety of different protocols and procedures in order to process the transfer of money for various types of transactions. Payment networks may be configured to perform transactions via cash-substitutes, which may include payment cards, letters of credit, checks, financial accounts, etc. Examples of networks or systems configured to perform as payment networks include those operated by various payment interchange networks such as Mastercard®.

Overview

Various example embodiments of the present disclosure provide methods, systems, user devices, and computer program products for facilitating scheduled payment transactions to a user using a payment application that enables the user to make scheduled payment transactions using a voice/text input. The payment application may be provided by a server system. In some example embodiments, the server system may belong to an issuer server of an issuer associated with a payment account of the user. The payment application may be installed by the user, on his/her user device from the server system or a third-party server system. The payment application on the user device is capable of a plurality of functionalities facilitated by the server system. For example, receiving a text/voice input from the user, extracting the payment transaction details present in the input by Natural Language Processing (NLP) methods, determining user authentication factors such as the GPS location of the user, a short video captured by the front camera of the user device, user typing dynamics, user speech factors etc., encrypting the details and the authentication factors and transmitting the encrypted data to the server system. The encrypted data is called a transaction request message hereinafter.

In one example embodiment, the server system is configured to train a data model that enables the server system to automatically authenticate the user without the user being prompted to provide extra authentication details. The server system is configured to receive a plurality of user authentication factors at pre-defined time intervals, from the user device. A user may install the payment application provided by the server system on his/her user device and register on the payment application to enable the option of making payment transactions via a voice/text input. After the user is registered, the server system facilitates the payment application on the user device to capture a plurality of user authentication factors such as the location of the user at various points of time, 3D facial photographs of the user captured from the front-facing camera of the user device at different intervals, user typing dynamics, etc. The user typing dynamics includes a plurality of factors such as the user's typing speed, slangs and shortcuts used by the user while typing or touching on keyboard, the pressure applied on the screen while typing each alphabet, and the like. The plurality of factors including the above-mentioned factors is hereinafter called a plurality of user authentication factors.

The payment application has stored instructions provided by the server system. The instructions cause the user device to send the plurality of user authentication factors to the server system at pre-defined time intervals. The predefined time interval may take any example, such as once in three hours or twice a day or the like, as defined by the server system. The server system is configured to train a data model based at least on the received plurality of user authentication factors at pre-defined time intervals. The server system has a Machine Learning (ML) model stored in the memory which enables the server system to train and continuously update the trained data model using the plurality of user authentication factors. The trained model may be maintained in a database of the server system or the trained data model may be maintained as a remote database. This trained data model is continuously updated by the server system to generate updated authentication templates and an authentication key that will be utilized to authenticate the users and decrypt the transaction request message received from the user device, respectively.

In one embodiment, the user may want to make a payment using the payment application. The user may open the payment application and a chat window may appear on the user device enabling the user to either provide a text input, an audio input or a combination thereof. In an example embodiment, the user may provide a text input that states "Hey App Snd Mom 5k on her mbl no @6 PM tmrw". As can be seen in this example, the user may use short forms or slangs particular to the user while providing the text input. The payment application is configured to extract payment transaction information and user's intent from the text input using Natural Language Processing (NLP). Without loss of generality, NLP algorithms such as Generative Adversarial Network and/or Long short-term memory models may be used by the application to analyze the text input provided by the user. In an embodiment, the payment application is configured to capture the user typing dynamics such as slangs and shortcuts used by the user not only on the payment application but on various applications on the user device, whenever the user utilizes the digital keyboard of the user device. The payment application provided by the server system may request the user to provide access to the keyboard application of the user device to be able to capture a plurality of user typing habits and patterns. The extracted payment transaction information also includes a scheduled time for payment, recipient account number or a recipient phone number, user account number, sum of the amount to transfer, etc.

In one example embodiment, when a user provides a voice/text input on the payment application, the payment application is configured to capture real-time user authentication factors of the user such as the location of the user, a short video of the user taken from a front-facing camera (or any other camera coupled with the user device) of the user device, user typing pattern and the like. The payment application facilitates the user device to capture the real-time user authentication factors in the background automatically when the user provides the voice/text input. An encryption key is generated by the payment application based on the real-time user authentication factors. The encryption key is used to encrypt the extracted transaction information and real-time user authentication factors. The payment application facilitates the user device to send the encrypted data to the server system. The encrypted data sent by the user device to the server system is called 'transaction request message' hereinafter.

In one example embodiment, the trained model of the server system is configured to generate a plurality of authentication templates based at least on the plurality of user authentication factors received by the user device at pre-defined time intervals. An authentication key is further generated based on the plurality of authentication templates.

The server system is configured to decrypt the transaction request message using the authentication key generated by the trained data model. After the decryption, the server system is configured to match the real-time user authentication factors with the plurality of authentication templates. If a match is found, the user is authenticated. Upon successful authentication, the server system is further configured to parse the transaction request message to determine a scheduled transaction instruction. The scheduled transaction instruction may include transaction information such as a payer account number, a recipient account number, amount of transaction, time and date for the transaction, etc. In cases where the user's bank and the recipient's bank are the same, only the recipient's mobile number is sufficient for the server system to process the payment.

After the scheduled transaction instruction is determined, the server system is configured to check the current time and when the current time is same as the scheduled time, the server system sends a payment processing request to a payment server for further processing. The payment server may belong to networks or systems operated by various payment interchange networks such as Mastercard®.

In an alternate embodiment, when a scheduled time is not present in the determined schedule transaction instruction, the server system is configured to send the payment processing request to the payment server instantly.

Various example embodiments of the present disclosure are described hereinafter with reference to FIGS. 1 to 7.

FIG. 1 illustrates an exemplary representation of an environment 100 related to at least some example embodiments of the present disclosure. The environment 100 generally includes a user device 104, a server system 106, an issuer server 108, an acquirer server 110, a payment network 112 in communication with (and/or with access to) a network 116. The payment network 112 may be associated with a payment server 114. The network 116 may include, without limitation, a local area network (LAN), a wide area network (WAN) (e.g., the Internet), a mobile network, a virtual network, and/or another suitable public and/or private network capable of supporting communication among two or more of the entities illustrated in FIG. 1, or any combination thereof. For example, the network 116 may include multiple networks, such as a private network made accessible by the payment network 112 to the acquirer server 110 and the issuer server 108, and a public network (e.g., the Internet) through which the acquirer server 110, the issuer server 108, and the payment server 114 may communicate.

In one embodiment, the acquirer server 110 is associated with a financial institution (e.g., a bank) that processes credit card transactions. This can be an institution that facilitates the processing of transactions for physical stores, merchants, or an institution that owns platforms that make online purchases or purchases made via software applications possible (e.g., shopping cart platform providers and in-app payment processing providers).

In one embodiment, the payment network 112 may be used by the payment cards issuing authorities as a payment interchange network. Examples of payment interchange network include but are not limited to, Mastercard® payment system interchange network. The Mastercard® payment system interchange network is a proprietary communications standard promulgated by Mastercard International Incorporated® for the exchange of financial transaction data between issuers and acquirers that are members of Mastercard International Incorporated®. (Mastercard is a registered trademark of Mastercard International Incorporated located in Purchase, N.Y.).

In one embodiment, the issuer server 108 is associated with a financial institution normally called as an "issuer bank" or "issuing bank" or simply "issuer", in which the user 102 may have a payment account, (which also issues a payment card, such as a credit card or a debit card), and provides microfinance banking services (e.g., payment transaction using credit/debit cards) for processing electronic payment transactions, to the user 102.

The environment 100 also depicts a user 102 who is shown to be using a payment application 118 on the user device 104 such as a mobile phone. However, the user device 104 may be any electronic device such as, but not limited to, a personal computer (PC), a tablet device, a Personal Digital Assistant (PDA), a voice-activated assistant, a Virtual Reality (VR) device, a smartphone, and a laptop. The payment application 118 may include at least one payment account therein that is issued by an issuer (e.g., on an issuer server 108) which may correspond to a bank, a credit agency or other type of financial institution. The payment application 118 is configured to facilitate payment transaction by receiving text/voice inputs by the user 102 in a natural language form.

The environment 100 also includes the server system 106 configured to perform one or more of the operations described herein. In general, the server system 106 is configured to facilitate scheduled payment transactions for users (e.g., user 102) via a payment application (e.g., Payment application 118) provided on the user devices (e.g., user device 104). The server system 106 is a separate part of the environment 100, and may operate apart from (but still in communication with, for example, via the network 116) the payment network 112 and issuer server 108 to facilitate the scheduled payment transactions. However, in other embodiments, the server system 106 may be incorporated, in whole or in part, into one or more parts of the environment 100, for example, the issuer server 108, and/or the payment network 112. Additionally, the server system 106 should be understood to be embodied in at least one computing device in communication with the network 116, which may be specifically configured, via executable instructions, to perform as described herein, and/or embodied in at least one non-transitory computer-readable media.

The payment application 118 may include actionable buttons displayed to the user 102. The user may click the actionable buttons to provide a text or voice inputs using the payment application 118. The user device 104 can be a feature phone with limited functionalities or a smartphone with internet connectivity. In other embodiments, the user device 104 can be any electronic device capable of utilizing various communication technologies such as Unstructured Supplementary Service Data (USSD) technology, SMS technology, Wi-Fi, mobile network data, etc. for processing payment transactions.

In an embodiment, the payment application 118 is configured to facilitate the user device 104 to continuously send a plurality of user authentication factors associated with the user 102 at pre-defined time intervals. The plurality of user authentication factors may include recorded voice notes of the user, 3D facial photographs of the user taken at different angles captured via a front facing camera of the user device 104, GPS location of the user device 104, user typing dynamics etc. User typing dynamics may include typing speed of the user 102, typing pattern of the user 102, slangs and shortcuts used by the user 102 white typing, pressure applied by the user 102 on each character of the keyboard while typing etc. The plurality of user authentication factors is sent to the server system 106, from the user device 104 via the payment application 118 at pre-defined time intervals. The pre-defined time interval may be set by the server system 106 or maybe set by the user 102 on the user device 104 using the payment application 118. The pre-defined time interval may be every 3 hours, every 5 hours or the like.

In an embodiment, the server system 106 is configured to train a data model using machine learning techniques based at least on the plurality of user authentication factors received from the user device at pre-defined time intervals. The server system 106 may update the trained data model continuously based on the received user authentication factors. In the embodiment, the payment application 118 gets access to the keyboard application of the user device 104. This enables the payment application 118 to continuously record the typing patterns, slangs and shortcuts used by the user 102 and pressure applied by the user 102 on each character while typing whenever the user 102 utilizes the keyboard of the user device 104 to type something. Similarly, user's facial factors, speech factors and the like may be learned by the server system 106 based on the authentication factors received from the user device 104 at pre-defined time intervals.

The server system 106 is further configured to generate a plurality of authentication templates using the trained data model. The plurality of authentication templates is used to authenticate the user automatically when a user initiates a payment by providing a voice/text input. The authentication templates are updated continuously as and when new user authentication factors are received from the user device 104, at pre-defined time intervals. As the data model is trained with the plurality of user authentication factors, it facilitates the generation of updated authentication templates when a new set of authentication factors is received from the user device 104. Further, an authentication key is generated by the server system 106 based at least on the plurality of authentication templates that is updated by the trained data model at pre-defined time intervals. Accordingly, the server system 106 is configured to update and train the data model which increases the confidence of the system in authenticating the user. The server system 106 is configured to authenticate a user automatically based on the plurality of authentication templates.

In one embodiment, the user may choose to input a text command on the payment application 118. The payment application 118 is configured to extract payment transaction information associated with the natural language input provided by the user. This is facilitated by using NLP techniques such as GAN and/or LSTM which are used to analyze, decipher, and understand natural human language to extract important information required by any system such as the server system 106 for the payment processing. Further, the payment application 118 is configured to capture real-time user authentication factors when the user 102 initiates a scheduled payment transaction by providing a voice/text input.

In a non-limiting example, the real-time user authentication factors are automatically captured in the background without prompting the user 102 to provide any form of input for the authentication purposes. The real-time user authentication factors may include a short video of the user 102 captured from the front-facing camera of the user device 104, a typing pattern of the user 102, a location of the user 102, etc. The payment application 118 is configured to encrypt the transaction information extracted from the text input and the real-time user authentication factors, using an encryption key.

The encryption key is generated based at least on the real-time user authentication factors. The transaction information may include user account number, recipient account number, scheduled time for the payment, a total sum of the amount and the like. The encrypted data holding extracted transaction information and the captured real-time user authentication factors are termed as 'transaction request message'. The transaction request message is sent to the server system 106 from the user device 104.

In one embodiment, the server system 106 is configured to decrypt the transaction request message using the authentication key generated by the server system 106. The authentication key is generated based at least on the plurality of authentication templates. Further, after the decryption is done, the real-time user authentication factors such as short video of the user 102, typing dynamics of the user 102, etc., that are present in the decrypted transaction request message are matched with the plurality of updated authentication templates generated by the server system 106. The plurality of authentication templates may include the latest 3D facial photographs of the user taken at different time intervals, user typing dynamics learned from the history of user authentication factors received from the user device 104 at pre-defined time intervals, location history of the user 102, etc. In an additional embodiment, if the user 102 has provided a voice input, the real-time authentication factors may include a voice recording of the user which will be matched with a learned speech factors such as voice modulation of the user 102, slangs and pronunciation of the user 102, etc., present in the plurality of authentication templates.

If the real-time user authentication factors decrypted from the transaction request message match with the plurality of user authentication templates, the server system 106 confirms the authenticity of the user 102. After successful authentication, the server system 106 is configured to parse the transaction request message to determine transaction information. The transaction information may include user account number, recipient account number and IFSC code, a sum of the payment amount, scheduled time for the payment, etc.

After the transaction information is determined, the server system 106 is configured to check if a scheduled time is present in the transaction information. In case of the scheduled time being present, the server system 106 is configured to send the payment for further processing to the payment server 114 when the current time is equal to the scheduled time. In an embodiment, if the scheduled time is not found in the determined transaction information, the server system sends a payment processing request to the payment server 114, instantly.

Figure 2:
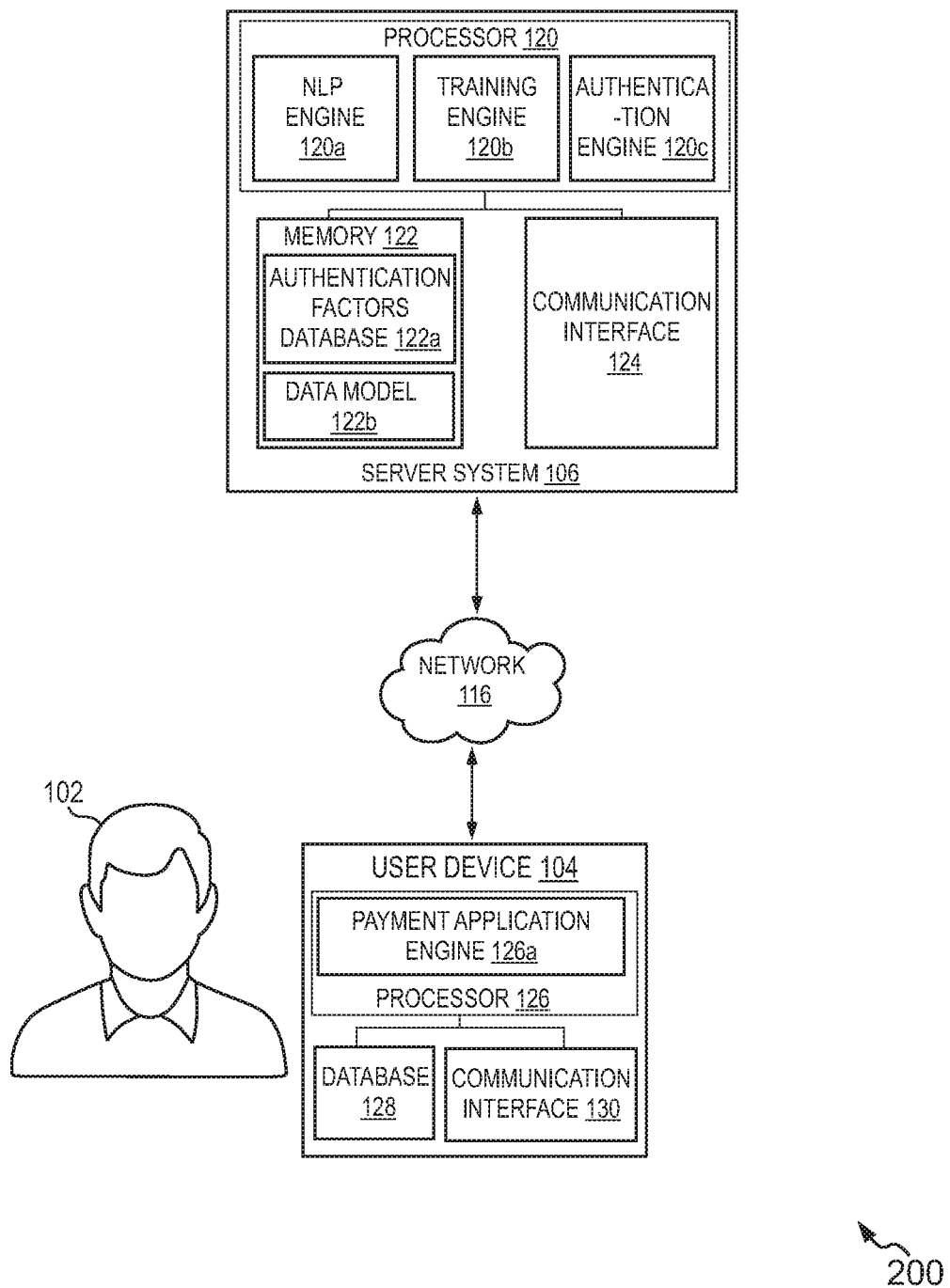
FIG. 2 is a simplified block diagram of a server system which facilitates scheduled payment transactions to users by receiving a text/voice input from a user.

FIG. 2 illustrates a simplified block diagram of a system 200 related to at least some example embodiments of the present disclosure. The system 200 is shown as including the user device 104 associated with the user 102 and the server system 106 in communication with (and/or with access to) the network 116. The network 116 may include, without limitation, a local area network (LAN), a wide area network (WAN) (e.g., the Internet), a mobile network, a virtual network, and/or another suitable public and/or private network capable of supporting communication among two or more of the entities illustrated in FIG. 2, or any combination thereof.

In an embodiment, the server system 106 generally includes a processor 120, a memory 122 and a communication interface 124. The processor 120 is operatively coupled to the communication interface 124 such that server system 106 is capable of communicating with a remote device such as the user device 104 or communicating with any entity within the network 116. For example, the communication interface 124 may receive a transaction request message from the user device 104.

The processor 120 may also be operatively coupled to the memory 122. The memory 122 is any computer-operated hardware suitable for storing and/or retrieving data, such as but not limited to, a plurality of user authentication factors associated with the user 102, user account details, a plurality of authentication templates, etc. The memory 122 may also store algorithms required to train a data model. The memory 122 may also store transaction information in a data structure. The memory 122 may include multiple storage units such as hard disks and/or solid-state disks in a redundant array of inexpensive disks (RAID) configuration. The memory 122 may include a storage area network (SAN) and/or a network-attached storage (NAS) system.

Similarly, the user device 104 may include a processor 126, a database 128 and a communication interface 130. The processor 126 is operatively coupled to the communication interface 130 such that the user device 104 is capable of communicating with a remote server such as the server system 106 or communicating with any entity within the network 116.

The processor 120 may further include a plurality of components that enables the server system 106 to implement at least some embodiments of the present disclosure. The processor 120 generally includes an NLP engine 120a, a training engine 120b, and an authentication engine 120c. The memory 122 may generally include authentication factor database 122a (also interchangeably referred to as "algorithm database 122a")) and a data model 122b.

In an example embodiment, the user 102 may download the payment application 118 on the user device 104. The payment application engine 126a is configured to facilitate the payment application on the user device 104 and enables the user 102 to make payment transactions by providing a text/voice input. The payment application 118 may include executable instructions provided by the server system 106. The payment application 118 may cause the user device to perform a plurality of operations. The payment application facilitates the user device 104 to capture a plurality of factors related to the user 102 as soon as the user 102 logs in to the payment application 118 using credentials given by the issuer. The factors may be such as, 3D facial photographs of the user 102 captured at different angles, recorded voice notes of the user 102, the user 102 typing some sample texts, etc. These factors may be captured when the user log in, access permissions (one time or multiple) for the camera, keyboard, microphone and location are sought from the user 102. After the user has provided the permissions, the user payment application 118 is configured to capture a plurality of user authentication factors at pre-defined time intervals and transmit the plurality of user authentication factors to the server system 106.

The training engine 120b of the processor 120 associated with the server system 106 is configured to train a data model 122b based at least on the plurality of user authentication factors received from the user device 104. The memory 122 is configured to store one or more machine learning algorithms in an algorithm database 122a. The algorithms stored in the algorithm database 122a may be utilized by the training engine 120b to train the data model 122b. The data model 122b is continuously updated as the training engine 120b is configured to learn from the newly received user authentication factors at pre-defined time intervals. The ML algorithms such as neural networks based learning algorithm, clustering techniques, regression methods, etc., may be used in training the data model 122b.

In an example embodiment, the user typing dynamics may include user typing patterns, slangs and shortcuts used by the user 102, the pressure applied by the user 102 on each character of a touch screen keyboard of the user device 104, etc. The payment application 118 is configured to capture such factors at pre-defined time intervals and send it to the server system 106. The training engine 120b of the server system 106 is configured to learn user typing dynamics associated with the user 102 based on the authentication factors received by the user device 104 at pre-defined time intervals. Similarly, voice and speech modulations, pronunciation, slangs used by the user 102 while speaking may be recorded and sent by the user device 104 to the server system 106 at pre-defined time intervals. The training engine 120b is also configured to learn the user speech factors and train the data model 122b based on the received speech factors of the user 102. The 3D facial photographs of the user 102 sent by the user device 104 are utilized to learn facial factors of the user 102.

Training the data model 122b continuously and updating the data model 122b, enable the server system 106 to generate a plurality of authentication templates to authenticate the user 102 with high confidence and to reduce fraud. The user 102 may be using the user device 104 at various times of the day and the payment application 118 is configured to capture and send the plurality of authentication factors associated with the user 102, to the server system 106, even if the user 102 does not run the payment application 118 on the user device 104. This enables continuous updating of user authentication factors at the server system 106.

The processor 120 of the server system 106 is configured to generate a plurality of authentication templates based on the trained data model 122b. The plurality of authentication templates may include learned user typing dynamics, the latest 3D facial photographs of the user 102, the latest locations where the user 102 was present, etc. The plurality of authentication templates is generated based on the updated trained data model 122b. The processor 120 is further configured to generate an authentication key based at least on the plurality of authentication templates. A new authentication key is generated by the processor 120 each time a new plurality of authentication template is generated by the processor 120.

In an example embodiment, the user 102 may open the payment application 118 on the user device 104 and choose to make a payment by inputting a text command. A chat interface may be presented on the user device 104, by the payment application 118 enabling the user to input a text command. For example, the user 102 may input a text command such as "send big bro a sum of 3k on his mbl num @5 PM tmrw frm mah accnt". The payment application 118 is configured to extract payment transaction information from the text input provided by the user 102 using NLP techniques. Natural language processing techniques include deciphering, analyzing and understanding natural language used by users to make it understandable by the computing devices.

In one embodiment, the payment application 118 is provided by the server system 106 and may be configured with the trained data model 122b. The payment application 118 on the user device may utilize the trained data model 122b to extract the payment transaction information using NLP based on the user typing dynamics stored in the data model 122b. In another embodiment, the data model with learned user typing dynamics may be stored in the memory 122 of the user device 104. In the example, the payment application 118 may decipher the text input and extract the following details: "the user's name and account: already linked on app Receiver's details: Big Bro, contact number is in contacts, Time: 5 PM tomorrow, Amount: INR 5,000.".

Further, the payment application 118 is configured to capture real-time user authentication factors as and when the user 102 provides the voice/text input. The real-time user authentication factors may include 3D facial photographs of the user 102, user typing dynamics, a current location of the user device 104, etc. In another embodiment where the user 102 may provide voice input, user voice dynamics may be included in the real-time user authentication factors instead of user typing dynamics.

Furthermore, the payment application 118 is configured to generate an encryption key based at least on the real-time user authentication factors. The encryption key is used to encrypt the extracted transaction information and the captured real-time user authentication factors and send a transaction request message to the server system 106. In the example, the payment application 118 may encrypt the following details: "the user's name and account: already linked on app Receiver's details: Big Bro, contact number is in contacts, Time: 5 PM tomorrow, Amount: INR 5,000", along with the real-time user authentication factors using the encryption key and transmit the transaction request message to the server system 106.

In an example embodiment, the server system 106, after receiving the transaction request message from the user device 104, is configured to decrypt the transaction request message using the authentication key generated by the processor 120. The authentication key is generated based on the plurality of authentication templates. The plurality of authentication templates may be updated each time new authentication factors are received by the user device at pre-defined time intervals. Further, after the decryption, an authentication engine 120c is configured to match the decrypted real-time user authentication factors with the plurality of authentication templates generated by the processor 120. It should be understood that the authentication templates are generated based on the historical authentication factors received from the user device 104 or from the account of the user 102 on the payment application 118. The authentication templates are stored and updated at periodic intervals at the memory 122.

If a match is found between the decrypted real-time user authentication factors and the stored authentication templates, the authenticity of the user 102 is confirmed. If a match is not found, the scheduled payment is cancelled by the server system 106. Upon successful authentication, the processor 120 is configured to parse the transaction information present in the decrypted transaction request message to determine a valid scheduled transaction instruction. The transaction information may include the name and account details of the user, name and account details of the recipient, transaction amount, and the scheduled time for payment. Based on the transaction information, the processor 120 is configured to forward a payment processing request to a payment network server such as the payment server 114 of FIG. 1. The processor 120 is configured to send the payment processing request to the payment server 114 when the current time is equal to the scheduled time.

In an alternate embodiment, when a scheduled time is not present in the determined transaction information, the processor 120 is configured to instantly send the payment processing request to the payment server enabling instant payments to the user 102.

Figure 3:
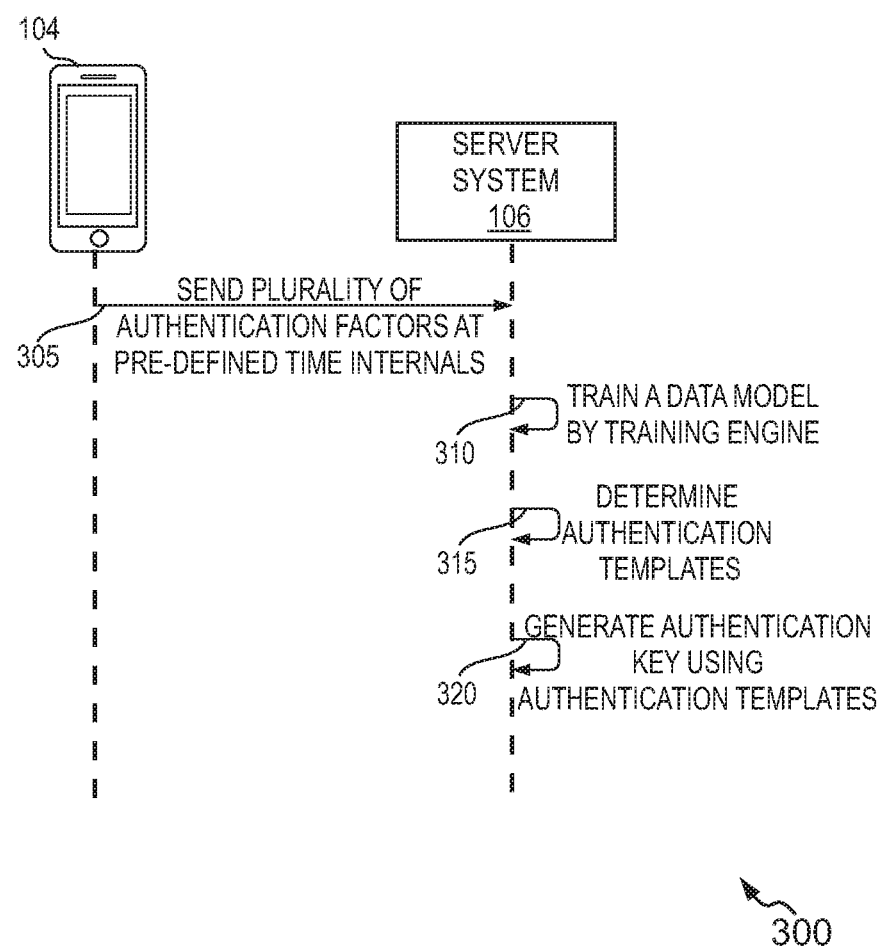
FIG. 3 is a sequence flow diagram for training of a data model, by the server system.

Referring now to FIG. 3, a sequence flow diagram 300 for facilitating training of a data model (e.g., data model 122b) by server system 106 is illustrated, in accordance with an example embodiment. The sequence of operations of the sequence flow diagram 300 may not be necessarily executed in the same order as they are presented. Further, one or more operations may be grouped together and performed in form of a single step, or one operation may have several sub-steps that may be performed in parallel or in sequential manner.

At 305, the user device 104 sends a plurality of user authentication factors to the server system 106 at pre-defined time intervals. The plurality of user authentication factors includes 3D photographs of user 102's face captured at different angles using a camera, location of the user device 104 detected at various time intervals, typing dynamics of the user 102 and/or speech factors of the user. The typing dynamics of the user 102 includes typing speed, slangs and shortcuts, typing patterns associated with the user 102, pressure applied by the user 102 on each character while typing, etc. and the speech factors may include speech and voice modulations, slangs, pronunciation associated with the user 102. All the user authentication factors are transmitted to the server system 106 at pre-defined time intervals, by the user device 104. The pre-defined time interval may be 2 hours, 4 hours or the like as set by the server system 106.

At 310, the server system 106 is configured to train the data model 122b of FIG. 2 based at least on the plurality of user authentication factors received from the user device 104. The processor 120 of the server system 106 includes a training engine 120b which is configured to learn the plurality of user authentication factors received from the user device 104 at pre-defined time intervals using one or more algorithms stored in the algorithm database 122a of FIG. 2. The algorithm database 122a may generally include ML algorithms such as the Fuzzy Expert System (FES s), NeuroEvolution of the augmenting topology (NEAT), Support Vector Machine (SVM), Chaotic Neural Network etc., which will be utilized by the training engine 120b to learn the typing dynamics of the user 102. Further, the algorithm database 122a may also include generalized matching face detection method and the adaptive regional blend matching method that may be used in 3D face recognition of the user 102.

In an additional embodiment, a plurality of voice biometric models and location based authentication models may also be stored in the algorithm database 122a enabling the training engine 120b to learn about the speech and location of the user 102 received by the user device 104 at pre-defined time intervals and training the data model 122b regarding the same.

At 315, the processor 120 of the server system is configured to generate a plurality of authentication templates based at least on the trained data model 122b. The trained data model 122b is updated at pre-defined time intervals as and when a new set of plurality of user authentication factors is received from the user device 104. The plurality of authentication template is also generated each time the trained data model 122b is updated. The plurality of authentication templates may be associated with each of the plurality of authentication factors such as user typing dynamics, user location based authentication, user speech recognition, user 3D face recognition and the like. The plurality of authentication templates is generated to enable automatic authentication of the user 102, by the server system 106. The plurality of authentication templates is matched with received real-time user authentication templates when the user 102 initiates a scheduled transaction.

At 320, the processor 120 of the server system 106 is configured to generate an authentication key based at least on the plurality of authentication templates. The authentication key enables the decryption of transaction request message received from the user device 104. The transaction request message received from the user device 104 is encrypted using an encryption key, wherein the encryption key is generated based at least on the real-time user authentication factors. To decrypt the transaction request message, the processor 120 is configured to generate an updated authentication key. The generation of updated authentication key is facilitated by generating authentication key based on the plurality of user authentication factors that is updated as and when the new set of user authentication factors is received from the user device 104 (as described in operation 315).

Thus, the data model 122b is trained using ML models and is continuously updated to enable automatic authentication of users who wish to make a payment using the payment application 118 via a text/voice input. The user is not prompted to input any extra details such as PIN or OTP for authenticating his/her identity. Further, generating an updated authentication key enables extra security measure as the authentication key is required by the server system 106 to decrypt the transaction request message.

Figure 4:
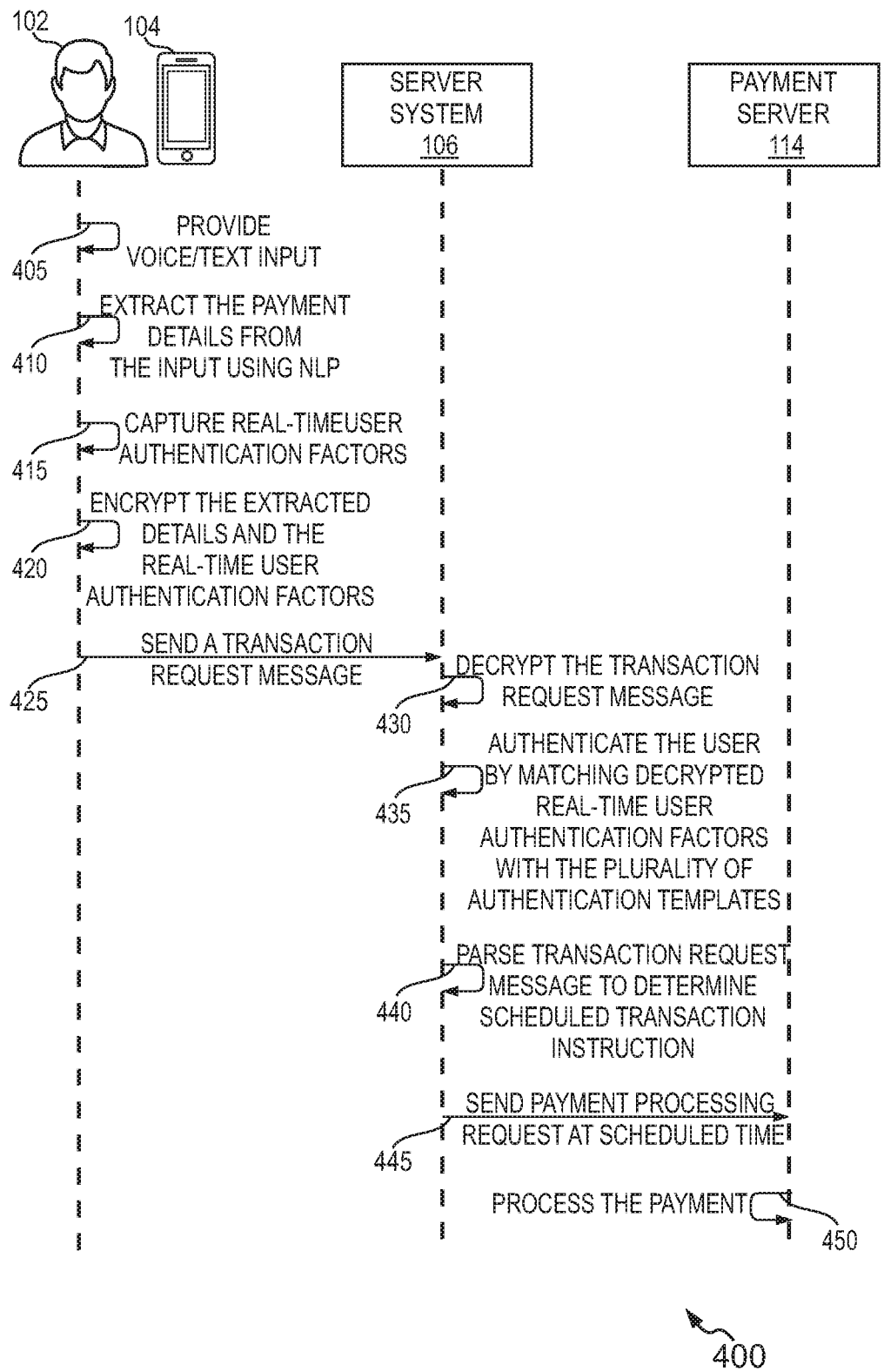
FIG. 4 is a sequence flow diagram for receiving transaction request message and processing a payment transaction, by the server system.

FIG. 4 illustrates a sequence flow diagram 400 for facilitating payment transaction to a user 102 using the payment application 118 via voice/text input in accordance with an example embodiment. The operations of the sequence flow diagram 400 may be performed by the server system 106. The sequence of operations of the sequence flow diagram 400 may not be necessarily executed in the same order as they are presented. Further, one or more operations may be grouped together and performed in form of a single step, or one operation may have several sub-steps that may be performed in parallel or in sequential manner.

At 405, the user 102 may input a voice/text input via the payment application 118 on the user device 104. The payment application 118 may be configured to provide an interface to the user 102 on the user device 104 that enables the user 102 to select one of a voice recorder or a text box to input a voice message or a text message, respectively. In an example, the user 102 may choose to provide a voice input. The user may select a voice recorder icon and start speaking. The user may say "Hey app, please send 5K to account number 112233xy with IFSC code XYZ69 from my account at 4 in the evening today". In another embodiment, the user 102 may also choose to provide a text input and provide a text input including text slangs and shortcuts.

At 410, the payment application 118 is configured to extract payment transaction information from the input provided by the user 102. The extraction is facilitated using NLP techniques. The user speech and slangs are learnt by the server system 106 and may be used in determining user slangs to enable extraction. As the payment application is hosted by the server system 106, the trained data model may be utilized by the payment application 118 using an Application Program Interface (API). In the example, the payment application may extract the following details using NLP: user name and account—stored in the application, recipient account number—112233xy, IFSC code—XYZ69, amount—5,000 INR and scheduled time—4 PM today.

In some scenarios, where the user's and recipient's accounts are from the same bank, only mobile number of the recipient is sufficient for the payment application 118 to proceed with the payment transaction. The payment application 118 is also configured to select the currency of transaction automatically based on the most used currency by the user 102.

At 415, the payment application 118 is configured to enable the user device 104 to capture real-time user authentication factors. The real-time user authentication factors may include a live short video of the user's face, current location of the user device 104, user typing dynamics while typing the text input or user speech factors while providing the voice input etc. The real-time user authentication factors are captured by the user device 104 as and when the user 102 provides the input. In the example, when the user 102 provides the voice input, the user device 104 may capture a live short video of the user 102 using the front-facing camera, voice recording using the microphone, location using the GPS system, and/or user typing dynamics using the keyboard application. The real-time user authentication factors are automatically captured in the background and the user is not prompted to take any extra steps. In the example, the payment application 118 may capture a live short video of the user 102's face, current location of the user device 104, and user speech factors while providing the voice input in the background.

At 420, the payment application 118 is further configured to encrypt the extracted transaction information and the captured real-time user authentication factors. The encryption is done based on an encryption key. The encryption key is generated by the payment application 118 based on the real-time user authentication factors. The encrypted data including transaction information and real-time user authentication factors enables secure transmission of the data. The transaction information and real-time authentication factors are protected from hackers and fraudsters due to encryption. The encrypted data is called 'transaction request message' hereinafter. In the example, the following details: user name and account—stored in the application, recipient account number—112233xy, IFSC code—XYZ69, amount—5,000 INR and scheduled time—4 PM today and the real-time user authentication factors may be encrypted using an encryption key to generate the transaction request message.

At 425, the payment application 118 is configured to send the transaction request message to the server system 106 for authentication and authorization. In an example embodiment, the server system 106 may belong to an issuer server and the user 102 may be using a mobile banking application provided by the issuer. The issuer servers are configured to authenticate and authorize the payment and forward it to a payment server associated with a payment interchange network. Similarly, the server system 106 may belong to an issuer and may be responsible for authenticating and authorizing the scheduled payment transaction initiated by the user 102. Further, the server system 106 may be responsible to forward the transaction to a payment server for further processing.

At 430, the server system 106 is configured to decrypt the transaction request message received from the user device 104. The decryption is facilitated using the authentication key generated by the processor 120 of the server system 106 as described in the step 320 of FIG. 3. In an embodiment, the authentication key is capable of decrypting the transaction request message which is encrypted using the encryption key. The authentication key is updated based on the updated authentication templates. In the example, the decrypted message may retrieve the transaction information such as user name and account—stored in the application, recipient account number—112233xy, IFSC code—XYZ69, amount—5,000 INR and scheduled time—4 PM today and the real-time user authentication factors which were encrypted by the payment application 118.

At 435, the authentication engine 120c of the processor 120 associated with the server system 106 is configured to authenticate the user 102 by matching the real-time user authentication factors decrypted from the transaction request message with the plurality of authentication templates generated by the processor 120 of the server system as described in the step 315 of FIG. 3. If a match is found between the real-time user authentication factors and the plurality of authentication templates, the user 102 is authenticated by the authentication engine 120c. In the example, if the real-time user authentication factors and the plurality of updated authentication templates are matched, then the user 102 is authenticated.

Upon authentication, at 440, an NLP engine 120a of the processor 120 associated with the server system 106 is configured to parse the transaction information decrypted from the transaction request message to determine a scheduled transaction instruction. The parsing of the transaction information using the NLP engine produces a parsed output facilitating the processor 120 to determine the transaction information. The transaction information includes the details such as sender name and account details, recipient account details/mobile number, transaction amount, scheduled time for payment and the like.

The transaction information maybe parsed in such a way that the server system 106 can authorize the transaction and send it for further processing. In the example, the server system 106 may authorize the transaction and check for the scheduled time. The server system 106 is further configured to forward the transaction for processing when the current time is equal to the scheduled time determined from the schedule transaction information. In the example provided above, the scheduled time is determined as 4 PM today. Accordingly, the server system 106 may forward the transaction for further processing when the current time of the same day is 4 PM.

At 445, the server system 106 is configured to send a payment processing request to a payment server at the scheduled time. The payment server may belong to an issuer server or a payment server associated with a payment interchange network. In this example, the server system 106 is considered to be belonging to an issuer server, and is configured to authorize the transaction and send a payment processing request to the payment server 114 of FIG. 1 at 4 PM of the same day.

At 450, the payment server 114 is configured to process and complete the payment. In the example, the payment server 114 may belong to interchange networks such as the payment network 112 and the payment server 114 may process and complete the payment by debiting the amount to an acquirer server associated with the recipient with account number—112233xy and IFSC code—XYZ69.

FIGS. 5A to 5D represent example representations of scheduled payment transactions facilitated by the payment application 118 displayed on the user device 104 of the user 102 with corresponding User Interfaces (UIs), in accordance with an example embodiment.

Figure 5A:
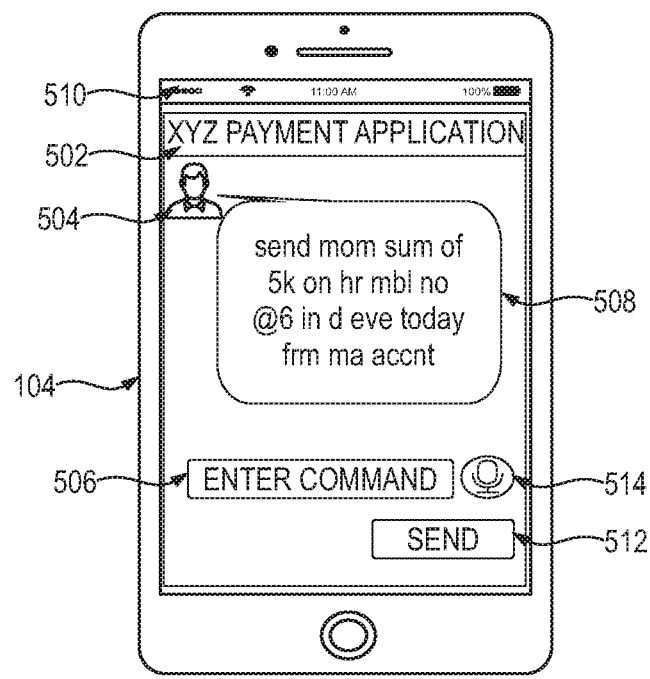
FIGS. 5A-5D illustrate User Interface (UI) representations of a payment application on a user device, facilitating payment transactions via text/voice inputs.
Figure 5B:
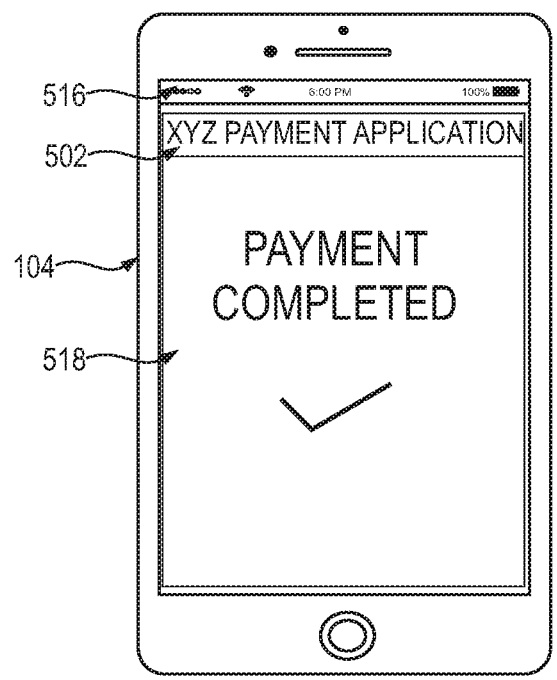

As shown in FIG. 5A, a UI 500 displays the name of the payment application 118 at the top of the display screen of the user device 104. The name 502 of the payment application 118 is exemplarily shown to be "XYZ payment application". The user icon 504 may display a profile picture of the user 102. In one form, where the user 102 has not uploaded any profile picture, a default image may be displayed in the place of the user icon 504. The payment application 118 may provide an interface to the user to input a text/voice input. In the UI 500, a text box 506 is displayed with an exemplary text "enter command". The text box 506 may allow the user 102 to tap on the text box 506 and provide a text input by typing on a digital keyboard. Similarly, a voice recording icon 514 is also displayed to the user, which on tapping will allow the user 102 to record a voice input. A "send" button 512 is displayed which facilitates the user to send the text input.

It is exemplarily shown in the UI 500 that the user 102 has sent a text input 508 on the payment application 118. The text input 508 is exemplarily shown as "send mom sum of 5k on hr mbl no @6 in d eve today frm ma accnt". The time 510 is exemplarily shown as 11:00 AM and the user is shown to have scheduled the payment at 6 PM. The payment application 118 is associated with the server system 106 which has a trained data model 122b stored in the memory 122 (see, FIG. 2). The trained data model 122b is configured to store learned user typing dynamics that includes slangs and shortcuts used by the user 102 learned over time. The payment application 118 may have an API that may be configured to link the payment application 118 to access the trained data model 122b. Using the trained data model 122b, the payment application 118 may be capable of extracting the transaction information from the text input 508 provided by the user 102 even if it is in a user-specific natural language.

In some embodiments, the payment application 118, itself, is configured to learn the user typing dynamics such as user typing patterns, slangs, and shortcuts used by the user 102, etc. This may enable the payment application 118 to extract the payment transaction information from the text input 508. The transaction information extracted in the above-mentioned example may be sender account name and account: stored in the payment application 118, recipient account details: Mom, the mobile number saved in contacts of the user device 104, amount: 5,000 INR, and scheduled time: 6 PM today.

The extracted transaction information and a plurality of real-time user authentication factors are encrypted using an encryption key, by the payment application 118. The encrypted data i.e. the transaction request message may be sent by the user device 104 to the server system 106. The server system 106 may decrypt the transaction request message using an authentication key generated based on the plurality of authentication templates. The server system 106 may further authenticate the user 102 by matching the decrypted real-time user authentication factors with the plurality of user authentication templates. If matched, the user 102 is authenticated and the payment is authorized by the server system 106.

The server system 106 is further configured to parse the transaction request message to determine a transaction information including the transaction information such as sender name and account details, recipient account details or mobile number, amount of transaction, and scheduled time. Based on the scheduled time, the server system 106 is configured to send a payment processing request to a payment server such as the payment server 114 of FIG. 1 when the current time is equal to the scheduled time. Thus, in the above-mentioned example, the server system 106 may forward the payment processing request to the payment server 114 at 6:00 PM. The payment server 114 may further process the payment and complete the scheduled payment transaction. It should also be understood that the user 102 may provide the natural language input in a variety of forms. For instance, the user 102 may write to perform scheduled transaction within a time interval, for example, between 4 PM to 8 PM on 10 Jan. 2020. Further, the user 102 may provide multiple instructions in one message, for example, the user 102 may request you to make transfer 1 to person 1, and transfer 2 to person 2 at certain times, from one or more payment accounts.

Further, a confirmation message may be displayed to the user at the scheduled time when the payment is completed by the payment server 114. Now turning to FIG. 5B, a UI 530 displays the name of the payment application 118 at the top of the display screen of the user device 104. The name 502 of the payment application 118 is exemplarily shown as "XYZ payment application". The time 516 is exemplarily shown as 6:00 PM which was the scheduled time for the payment transaction by the user 102. A confirmation message 518 is displayed to the user. The confirmation message is exemplarily shown as "Payment completed".

Figure 5C:
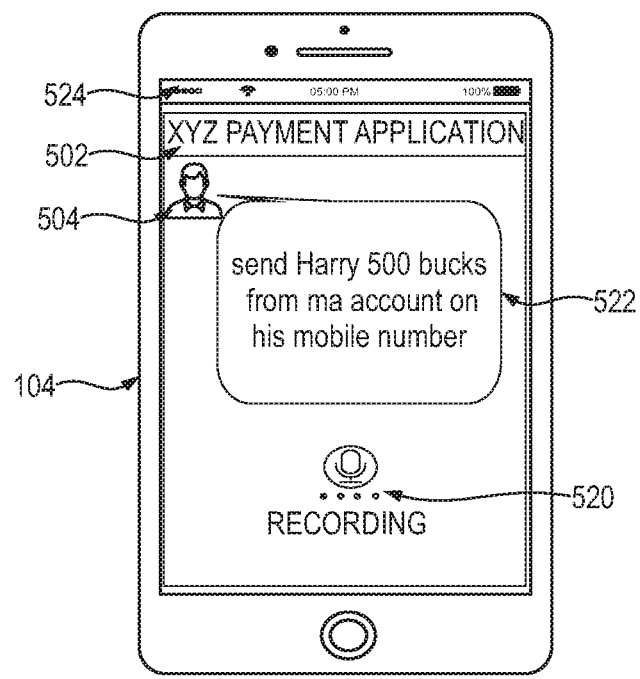
Figure 5D:
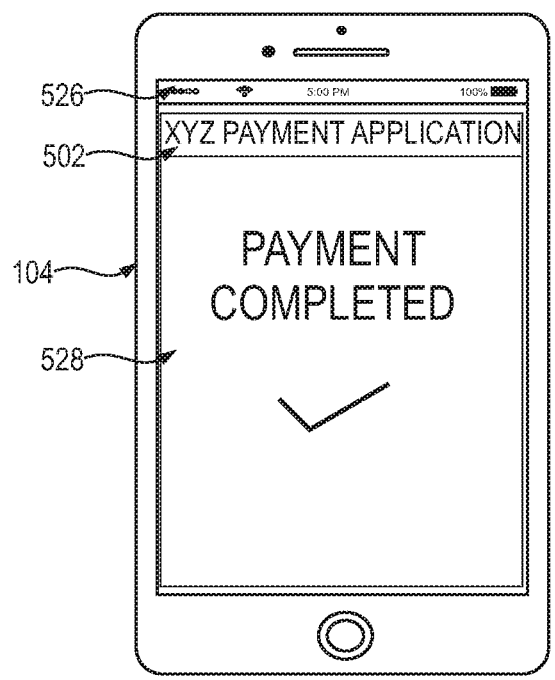

As shown in FIG. 5C, a UI 540 displays the name of the payment application 118 at the top of the display screen of the user device 104. The name 502 of the payment application 118 is exemplarily shown as "XYZ payment application". The user icon 504 may display a profile picture of the user 102. In an example, where the user 102 has not uploaded any profile picture, a default image may be displayed in the place of the user icon 504. It is exemplarily shown that the user 102 has chosen to provide a voice input to the payment application 118. The user 102 is assumed to be speaking near the user device 104 and a recording symbol 520 is shown in the UI 540 depicting that the payment application 118 is facilitating a speech to text conversion and is displaying the voice input provided by the user 102 on the screen as a text 522. The text 522 is exemplarily shown as "send Harry 500 bucks from ma account on his mobile number." It is to be noted that the user 102 has not provided the scheduled time for the transaction. Thus, in the example embodiment the server system 106 is configured to authenticate and authorize the payment transaction and forward the payment processing request to the payment server 114 instantly. The time 524 is exemplarily shown as 5:00 PM when the user 102 has provided the voice input.

When the user 102 provides the voice input, the payment application 118 is configured to convert the voice input into the text 522 and when the user 102 stops speaking, the payment application 118 is configured to process the input for proceeding the payment transaction. The payment application 118 is associated with the server system 106 which has the trained data model 122b stored in the memory 122 of FIG. 2. The trained data model 122b is configured to store learned speech factors related to the user 102 that include user speech, voice modulation, slangs used by the user while speaking, etc. The payment application 118 may have an API that may be configured to link the payment application 118 to access the trained data model 122b from the server system 106. Using the trained data model 122b, the payment application 118 may be capable of extracting the transaction information from the text 522 provided by the user 102 even if it is in a user-specific natural language.

In some embodiments, the payment application 118 itself is configured to learn the speech factors related to the user 102, such as user speech, voice modulation, slangs used by the user while speaking, etc. This may enable the payment application 118 to extract the payment transaction information from the text 522. The transaction information extracted in the above example may be sender account name and account: stored in the application, recipient account details:

Harry, the mobile number saved in contacts, amount: 500 INR and scheduled time as "none".

The extracted transaction information and a plurality of real-time user authentication factors are encrypted using an encryption key, by the payment application 118. The encrypted message i.e. the transaction request message may be sent by the user device 104 to the server system 106. The server system 106 may decrypt the transaction request message using an authentication key generated based on the plurality of authentication templates. The server system 106 may further authenticate the user 102 by matching the decrypted real-time user authentication factors with the plurality of user authentication templates. If matched, the user 102 is authenticated and the payment is authorized by the server system 106.

The server system 106 is further configured to parse the transaction request message to determine a transaction information including the transaction information such as sender name and account details, recipient account details or mobile number, amount of transaction, scheduled time. As in the illustrated example of FIG. 5C, the user 102 has not provided any scheduled time input, the server system 106 is configured to instantly send a payment processing request to the payment server 114 for further processing. The payment server 114 may further process the payment and complete the scheduled payment transaction.

Further, a confirmation message may be displayed to the user at the scheduled time when the payment is completed by the payment server 114. Now turning to FIG. 5D, a UI 550 displays the name of the payment application 118 at the top of the display screen of the user device 104. The name 502 of the payment application 118 is exemplarily shown as "XYZ payment application". The time 526 is exemplarily shown as 5:00 PM which was the time when the user 102 provided the voice input to the payment application 118. A confirmation message 528 is displayed to the user 102. The confirmation message is exemplarily shown as "Payment completed".

Figure 6:
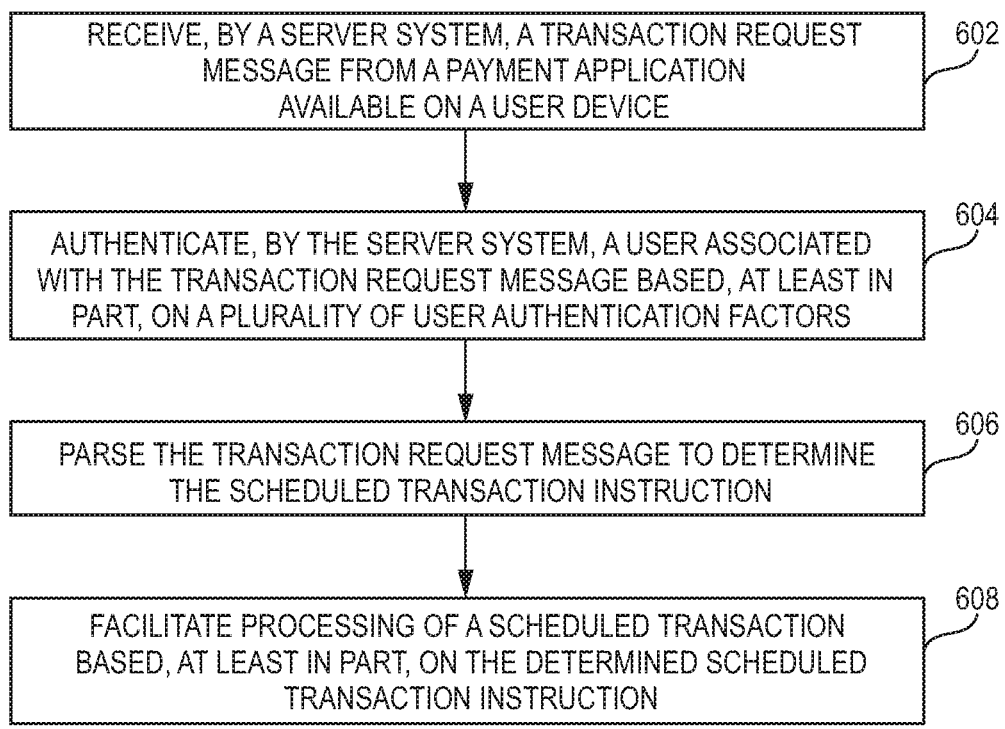
FIG. 6 represents a flow diagram of a computer implemented method for making payment transactions via a text/voice input.

FIG. 6 illustrates a flow diagram of a method 600 for facilitating payment transactions for users via text/voice inputs, in accordance with an example embodiment. The method 600 depicted in the flow diagram may be executed by, for example, the at least one server system such as an issuer server. The operations of the flow diagram 600, and combinations of operation in the flow diagram 600, may be implemented by, for example, hardware, firmware, a processor, circuitry and/or a different device associated with the execution of software that includes one or more computer program instructions. The method 600 starts at operation 602.

At 602, the method 600 includes receiving, by a server system (e.g., server system 106), a transaction request message from a payment application (e.g., payment application 118) available on a user device (e.g., user device 104). The transaction request message includes a scheduled transaction instruction in the form of natural language input. The transaction request message is sent by the user device 104, and it may include transaction information and real-time user authentication factors.

At 604, the method 600 includes authenticating, by the server system (e.g., server system 106), a user (e.g., user 102) associated with the transaction request message based, at least in part, on a plurality of user authentication factors. The plurality of user authentication factors is received from the user device (e.g., user device 104) by the server system (e.g., server system 106).

Upon successful authentication of the user (e.g., user 102), at 606, the method 600 includes, parsing the transaction request message to determine the scheduled transaction instruction.

At 608, the method 600 includes, facilitating processing of a scheduled transaction based, at least in part, on the determined scheduled transaction instruction. The method ends at 608.

Figure 7:
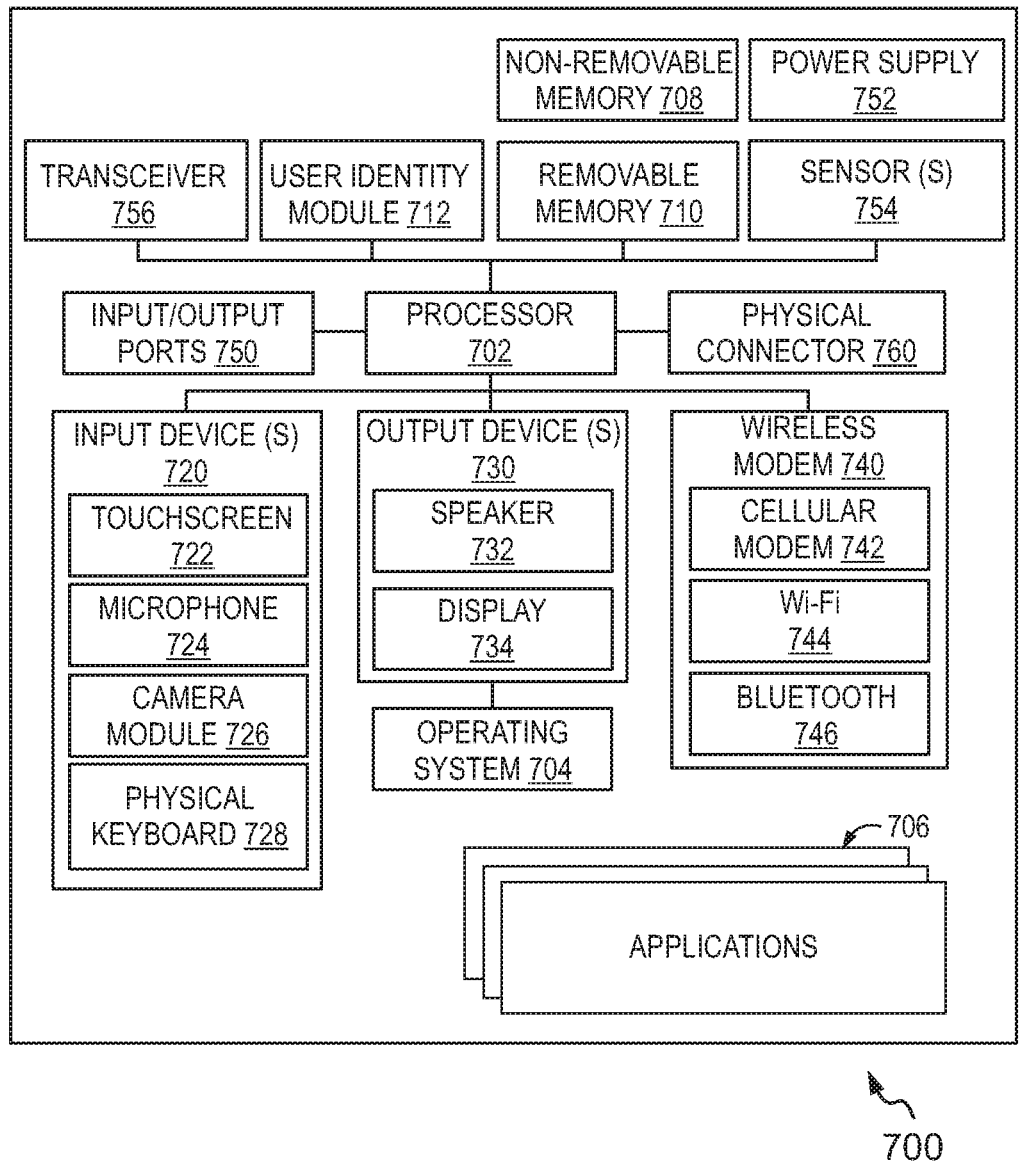
FIG. 7 is a simplified block diagram of a user device associated with the user, capable of implementing at least some embodiments of the present disclosure.

FIG. 7 shows a simplified block diagram of a device 700 for example, a user device 104 capable of implementing the various embodiments of the present disclosure. The device 700 is depicted to include one or more applications 706. The device 700 is an example of the user device 104. It should be understood that the device 700 as illustrated and hereinafter described is merely illustrative of one type of device and should not be taken to limit the scope of the embodiments. As such, it should be appreciated that at least some of the components described below in connection with the device 700 may be optional and thus in an example embodiment may include more, less or different components than those described in connection with the example embodiment of the FIG. 7. As such, among other examples, the device 700 could be any of an electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated device 700 includes a controller or a processor 702 (e.g., a signal processor, microprocessor, ASIC, or other control and processing logic circuitry) for performing such tasks as signal coding, data processing, image processing, input/output processing, power control, and/or other functions. An operating system 704 controls the allocation and usage of the components of the device 700 and supports for one or more applications programs (see, applications 706), such as an application interface in a user device (e.g., the user device 104) of a user (e.g., the user 102). The application interface in the user device 104 is used for providing a voice or text input to the server system, encrypting a scheduled transaction instruction and real-time user authentication factors to send it to the server system, continuously extracting plurality of user authentication factors and sending it to the server system. In addition to the application interface, the applications 706 may include common mobile computing applications (e.g., telephony applications, email applications, calendars, contact managers, web browsers, messaging applications such as USSD messaging or SMS messaging or SIM Tool Kit (STK) application) or any other computing application.

The illustrated device 700 includes one or more memory components, for example, a non-removable memory 708 and/or removable memory 710. The non-removable memory 708 and/or removable memory 710 may be collectively known as database in an embodiment. The non-removable memory 708 can include RAM, ROM, flash memory, a hard disk, or other well-known memory storage technologies. The removable memory 710 can include flash memory, smart cards, or a Subscriber Identity Module (SIM). The one or more memory components can be used for storing data and/or code for running the operating system 704 and the applications 706. The device 700 may further include a user identity module (UIM) 712. The UIM 712 may be a memory device having a processor built in. The UIM 712 may include, for example, a subscriber identity module (SIM), a universal integrated circuit card (UICC), a universal subscriber identity module (USIM), a removable user identity module (R-UIM), or any other smart card. The UIM 712 typically stores information elements related to a mobile subscriber. The UIM 712 in form of the SIM card is well known in Global System for Mobile (GSM) communication systems, Code Division Multiple Access (CDMA) systems, or with third-generation (3G) wireless communication protocols such as Universal Mobile Telecommunications System (UMTS), CDMA7000, wideband CDMA (WCDMA) and time division-synchronous CDMA (TD-SCDMA), or with fourth-generation (4G) wireless communication protocols such as LTE (Long-Term Evolution).

The device 700 can support one or more input devices 720 and one or more output devices 730. Examples of the input devices 720 may include, but are not limited to, a touch screen/a screen 722 (e.g., capable of capturing finger tap inputs, finger gesture inputs, multi-finger tap inputs, multi-finger gesture inputs, or keystroke inputs from a virtual keyboard or keypad), a microphone 724 (e.g., capable of capturing voice input), a camera module 726 (e.g., capable of capturing still picture images and/or video images) and a physical keyboard 728. Examples of the output devices 730 may include, but are not limited to, a speaker 732 and a display 734. Other possible output devices can include piezoelectric or other haptic output devices. Some devices can serve more than one input/output function. For example, the touch screen 722 and the display 734 can be combined into a single input/output device.

A wireless modem 740 can be coupled to one or more antennas (not shown in the FIG. 7) and can support two-way communications between the processor 702 and external devices, as is well understood in the art. The wireless modem 740 is shown generically and can include, for example, a cellular modem 742 for communicating at long range with the mobile communication network, a Wi-Fi compatible modem 744 for communicating at short range with an external Bluetooth-equipped device or a local wireless data network or router, and/or a Bluetooth-compatible modem 746. The wireless modem 740 is typically configured for communication with one or more cellular networks, such as a GSM network for data and voice communications within a single cellular network, between cellular networks, or between the device 700 and a public switched telephone network (PSTN).

The device 700 can further include one or more input/output ports 750 for establishing connection with peripheral devices including a power supply 752, one or more sensors 754 for example, an accelerometer, a gyroscope, a compass, or an infrared proximity sensor for detecting the orientation or motion of the device 700 and biometric sensors for scanning biometric identity of an authorized user, a transceiver 756 (for wirelessly transmitting analog or digital signals) and/or a physical connector 760, which can be a USB port, IEEE 794 (FireWire) port, and/or RS-232 port. The illustrated components are not required or all-inclusive, as any of the components shown can be deleted and other components can be added.

With the application (see, applications 706) and/or other software or hardware components, the device 700 can implement the technologies described herein. In one example embodiment, the processor 702 can cause extraction of transaction information, capturing a plurality of user authentication factors and sending it to the server system 106, capturing real-time user authentication factors, generating an encryption key, encryption of the transaction information and the real-time user authentication factors, and transmission of the transaction request message to the server system 106.

Without limiting the scope of the present disclosure, the one or more example embodiments disclosed herein provide methods and systems for processing scheduled transactions even when the user provides the payment instructions via a chat message in a natural language form through a payment application. For instance, the user may provide a casual instruction in the chat message through a text message or voice input. The server system is configured to perform a natural language processing to extract the payment transaction information related information from the user's chat message originally sent in the natural language form. Further, the authentication of the user for payment processing is performed based on a variety of user's specific information such as device usage habits of the user, interaction pattern with the keyboard/touch pad/touch screen of the user's device, live location or location history of the user, time of the day, etc. Hence, embodiments of the present disclosure provide a very intuitive experience for the user while performing payment transactions and especially a scheduled transaction. For instance, a user can provide input in a natural language form to perform a financial transaction to be performed later at a specific time and the server system, by following the teachings of the present disclosure, will be capable of executing the payment transaction.

Various embodiments of the present disclosure provide an application provided by the server system, on the user device enabling the user to make scheduled payment transactions via a voice/text input. The server system is configured to train a data model by learning user typing dynamics, user facial factors and speech factors etc. This enables the application to understand a user-specific input provided in the natural language format. Further, as the server system maintains a trained data model, the identity of the user is automatically authenticated without the user being prompted to provide extra authentication details. Additionally, the present disclosure provides an effective way for reducing fraud and theft of user's personal details as the data model cannot be faked or replicated.

The disclosed methods with reference to FIGS. 1 to 7, or one or more operations of the flow diagram 600 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the disclosure has been described with reference to specific exemplary embodiments, it is noted that various modifications and changes may be made to these embodiments without departing from the broad spirit and scope of the disclosure. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the system 200 (e.g. server system 106) and its various components such as the processor 120 and the memory 122 may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media.

Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-RAY (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the disclosure, as discussed above, may be practiced with steps and/or operations in a different order, and/or with hardware elements in configurations, which are different than those which, are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

We claim:

1. A computer-implemented method, comprising:

receiving, by a payment application executing on a user device, a voice or text input from a user;

while the user is providing the voice or text input via the payment application, automatically capturing, by the payment application, one or more real-time user authentication factors, the real-time user authentication factors comprising the following: user voice dynamics, a GPS location of the user device, 3D facial photographs of the user, and user typing dynamics;

invoking, by the payment application, an application programing interface (API) exposed by a trained data model residing on a server system hosting the payment application;

extracting, by the payment application, payment transaction information from the voice or text input provided by the user utilizing the trained data model;

generating, via the payment application, an encryption key based on the real-time user authentication factors automatically captured by the payment application;

generating, by the payment application, an encrypted transaction request message by encrypting, with the encryption key, the captured real-time user authentication factors and the extracted payment transaction information;

transmitting, by the payment application, the encrypted transaction request message to the server system;

receiving, by the server system, the encrypted transaction request message from the payment application;

generating, by the trained data model, an authentication key based on a plurality of authentication templates stored on the server system;

decrypting, by the server system, the encrypted transaction request message using the authentication key;

matching, by the server system, the real-time user authentication factors with the plurality of authentication templates;

in response to a successful match, authenticating, by the server system, the user;

generating, by the server system, a payment processing request; and transmitting, by the server system, the payment processing request to a payment server.

2. The computer-implemented method as claimed in claim 1, further comprising:

receiving, by the server system from the user device, a plurality of user authentication factors at pre-defined time intervals;

updating, by the server system, the trained data model, based, at least in part, on the plurality of user authentication factors; and generating, by the server system, the plurality of authentication templates based on the trained data model.

3. The computer-implemented method as claimed in claim 2, wherein the plurality of user authentication factors comprises:

recorded voice notes of the user;
a GPS location of the user device;
3D facial photographs of the user; and
user typing dynamics.

4. The computer-implemented method as claimed in claim 2, further comprising training, by the server system, the trained data model using the plurality of user authentication factors.

5. The computer-implemented method as claimed in claim 1, wherein the real-time user authentication factors further comprises:
user speech factors; and
a video of the user.

6. The computer-implemented method as claimed in claim 1, further comprising:
parsing the transaction request message; and
determining, from the payment transaction information, a scheduled transaction instruction,
wherein the scheduled transaction instruction further comprises user account details, a scheduled time, a transaction amount, and at least one of the following: recipient account details and a recipient phone number.

7. The computer-implemented method as claimed in claim 6, wherein transmitting the payment processing request to the payment server comprises transmitting the payment processing request to the payment server at the scheduled time.

8. The computer-implemented method as claimed in claim 6, wherein the scheduled transaction instruction is in the form of a text input or a voice input.

9. The computer-implemented method as claimed in claim 1, wherein the step of extracting the payment transaction information from the voice or text input utilizing the trained data model includes using natural language processing (NLP).

10. A system comprising:
a user device having a payment application executing thereon, the payment application configured to:
receive a voice or text input from a user;
while the user is providing the voice or text input, automatically capture one or more real-time user authentication factors, the real-time user authentication factors comprising the following: user voice dynamics, a GPS location of the user device, 3D facial photographs of the user, and user typing dynamics;
invoke an application programing interface (API) exposed by a trained data model residing on a server system hosting the payment application;
extract payment transaction information from the voice or text input provided by the user utilizing the trained data model;
generate an encryption key based on the real-time user authentication factors automatically captured by the payment application;
generate an encrypted transaction request message, including:
encrypting the captured real-time user authentication factors and the extracted payment transaction information; and
transmit the encrypted transaction request message to the server system; and
a server system hosting the payment application, the server system comprising:
a communication interface configured to:
receive the encrypted transaction request message from the payment application,
a memory storing a plurality of authentication templates and the trained data model thereon, the memory comprising executable instructions; and
a processor communicably coupled to the communication interface and the memory, the processor configured to execute the executable instructions, which cause the processor to:
generate, using the trained data model, an authentication key based on the plurality of authentication templates;
decrypt the encrypted transaction request message using the authentication key;
match the real-time user authentication factors with the plurality of authentication templates;
in response to a successful match, authenticate the user;
generate a payment processing request; and
transmit the payment processing request to a payment server.

11. The system as claimed in claim 10, wherein the processor is further caused to:
receive, from the user device, a plurality of user authentication factors at pre-defined time intervals;
update the trained data model based, at least in part, on the plurality of user authentication factors; and
generate the plurality of authentication templates based on the trained data model.

12. The system as claimed in claim 11, wherein the plurality of user authentication factors comprises:
recorded voice notes of the user;
a GPS location of the user device;
3D facial photographs of the user; and
user typing dynamics.

13. The system as claimed in claim 11, wherein the processor is further caused to train the trained data model using the plurality of user authentication factors.

14. The system as claimed in claim 10, wherein real-time user authentication factors further comprise:
user speech factors; and
a video of the user.

15. The system as claimed in claim 10, wherein the processor is further caused to:
parse the transaction request message; and
determine, from the payment transaction information, a scheduled transaction instruction,
wherein the scheduled transaction instruction further comprises user account details, a scheduled time, a transaction amount, and at least one of the following: recipient account details and a recipient phone number.

16. The system as claimed in claim 15, wherein transmitting the payment processing request to the payment server comprises transmitting the payment processing request to the payment server at the scheduled time.

17. The system as claimed in claim 15, wherein the scheduled transaction instruction is in the form of a text input or a voice input.

18. The system as claimed in claim 10,
wherein the step of extracting the payment transaction information from voice or text input utilizing the trained data model includes using natural language processing (NLP).

* * * * *

UNITED STATES PATENT AND TRADEMARK OFFICE
CERTIFICATE OF CORRECTION

Page 1 of 1

PATENT NO.         : 12,450,577 B2
APPLICATION NO.    : 18/476914
DATED              : October 21, 2025
INVENTOR(S)        : Peeyush Bansal, Avinash Kumar and Rishabh Mehra It is certified that error appears in the above-identified patent and that said Letters Patent is hereby corrected as shown below:

On the Title Page

Item [30], insert:
--May 30, 2020 (IN) .............................. 202041022797--

Signed and Sealed this
Eighteenth Day of November, 2025

John A. Squires
*Director of the United States Patent and Trademark Office*